US012564984B2

(12) United States Patent
Moon et al.

(10) Patent No.: US 12,564,984 B2
(45) Date of Patent: Mar. 3, 2026

(54) WALLBOARD SLURRY MIXER CONFIGURED FOR REDUCING WATER:STUCCO RATIO

(71) Applicant: KNAUF GIPS KG, Iphofen (DE)

(72) Inventors: Myung-Sik Moon, Manvel, TX (US); Noel G. Villarreal, Deer Park, TX (US); Christopher E. Reyna, Houston, TX (US)

(73) Assignee: KNAUF GIPS KG, Iphofen (DE)

( * ) Notice: Subject to any disclaimer, the term of this patent is extended or adjusted under 35 U.S.C. 154(b) by 670 days.

(21) Appl. No.: 18/047,024

(22) Filed: Oct. 17, 2022

(65) Prior Publication Data

US 2023/0294326 A1 Sep. 21, 2023

Related U.S. Application Data

(60) Provisional application No. 63/269,386, filed on Mar. 15, 2022.

(51) Int. Cl.
*B28C 5/16* (2006.01)
*B28C 5/08* (2006.01)
*B28C 5/12* (2006.01)

(52) U.S. Cl.
CPC ............ *B28C 5/166* (2013.01); *B28C 5/0831* (2013.01); *B28C 5/1238* (2013.01)

(58) Field of Classification Search
CPC ......... B28C 5/1269; B28C 5/386; B28C 5/02; B28C 5/0881; B28C 5/06; B28C 5/166; B28C 5/0831; B28C 5/1238; B28C 5/0806; B01F 2005/0639; B01F 3/04446; B01F 5/061; B01F 5/0614; B28B 19/0092; B28B 17/023
See application file for complete search history.

(56) References Cited

U.S. PATENT DOCUMENTS 2,660,416 A 11/1953 Camp et al.
3,459,620 A 8/1969 McCleary et al.
4,176,972 A 12/1979 Stiling
5,643,510 A 7/1997 Sucech
5,683,635 A * 11/1997 Sucech .................. C04B 28/14 264/43
5,904,308 A 5/1999 Schnell
6,059,444 A * 5/2000 Johnson ................ B28C 5/0881 366/172.1
6,494,609 B1 12/2002 Wittbold et al.
6,783,271 B1 8/2004 Makarenko et al.
(Continued)

FOREIGN PATENT DOCUMENTS

CN 205731063 U 11/2016
CN 112518988 A 3/2021
WO 2020155567 A1 8/2020

OTHER PUBLICATIONS

International Search Report and Written Opinion received for PCT/US2023/064032, mailed Jun. 21, 2023.

*Primary Examiner* — Charles Cooley
(74) *Attorney, Agent, or Firm* — Greer, Burns & Crain, Ltd; Pradip Sahu

(57) ABSTRACT

An agitator for a gypsum wallboard mixer is provided and includes a circular disc with an upper surface, a drive shaft extending vertically from the upper surface, a lump ring secured to the upper surface, the lump ring being provided in a plurality of spaced, adjacent arcuate segments.

13 Claims, 6 Drawing Sheets

(56) References Cited

U.S. PATENT DOCUMENTS

| | | | | |
|---|---|---|---|---|
| 6,874,930 | B2 | 4/2005 | Wittbold et al. | |
| 10,011,045 | B2 | 7/2018 | Wittbold et al. | |
| 10,717,059 | B2 * | 7/2020 | Scaff | B28C 7/126 |
| 2018/0333691 | A1 * | 11/2018 | Scaff | B28C 5/1238 |
| 2021/0283559 | A1 | 9/2021 | Drebenstedt | |
| 2023/0294326 | A1 * | 9/2023 | Moon | B28C 5/166 366/1 |
| 2023/0406781 | A1 * | 12/2023 | Vilinska | B01F 27/1152 |
| 2025/0269558 | A1 * | 8/2025 | Hirooka | B28C 5/0881 |

* cited by examiner

WALLBOARD SLURRY MIXER CONFIGURED FOR REDUCING WATER:STUCCO RATIO

RELATED APPLICATION

This application is a Non-Provisional of, and claims 35 USC 119 priority from, U.S. Provisional Application Ser. No. 63/269,386 filed Mar. 15, 2022, the entire contents of which are incorporated by reference herein.

BACKGROUND

The present invention is related to mixing apparatus, and more specifically to mixers configured for mixing slurries used to manufacture gypsum wallboard panels or the like.

It is well known to produce gypsum products by dispersing calcined gypsum in water to form a slurry and then casting the slurry into a desired shaped mold or onto a surface and allowing the slurry to set to form hardened gypsum by reaction of the calcined gypsum (calcium sulfate hemihydrite or anhydrite) with the water to form hydrated gypsum (calcium sulfate dihydrate). It is also well known to produce a lightweight gypsum product by mixing an aqueous foam into the slurry to produce air bubbles. This will result in a desired distribution of voids in the set gypsum product if the bubbles do not escape from the slurry before the hardened gypsum forms. The voids lower the density of the final product, which is often referred to as "foamed gypsum."

Prior apparatus and methods for addressing some of the operational problems associated with the mixing of gypsum wallboard slurries and the production of foamed gypsum are disclosed in commonly-assigned U.S. Pat. Nos. 5,683,635; 5,643,510; 6,494,609; 6,874,930; and 10,011,045, all of which are incorporated by reference in their entirety. The present invention relates generally to mixers used in the formulation of gypsum slurries in the production of gypsum wallboard.

A gypsum wallboard mixer typically includes a housing defining a mixing chamber with inlets for receiving calcined gypsum and water, as well as other additives well known in the art. An impeller or other type of agitator is mounted in the mixer for agitating the contents to be mixed into a mixture or slurry. The impeller is typically provided with vertically projecting pins configured for agitating the slurry as the impeller rotates about a central shaft.

Pin mixers are known for their relatively high quality mixing ability, which is preferred for producing lighter weight wallboard panels. A known drawback of pin mixers is the long residence time during which the slurry is agitated until it is fully mixed. In many applications, extra water must be added to the mixer to lower the viscosity of the slurry, and to retard premature setting and/or the formation of lumps, which are detrimental to high quality wallboard panels.

The addition of the extra water to the mixer is an operational drawback for wallboard production, since extra energy is then required to satisfactorily dry the board in producing the desired wallboard panels. As such, a design parameter for producing gypsum wallboard slurries is to reduce water in the mixer where possible. This concept is also referred to as reducing the water:stucco ratio.

Thus, there is a need for an improved mixer for wallboard slurries, in which the residence time of the slurry is reduced, and where the water:stucco ratio is reduced.

SUMMARY

The above-listed need is met or exceeded by the present wallboard slurry mixer, in which gaps in the mixer lump ring were provided to reduce slurry residence time without reducing board quality. By providing gaps in the circumference of the mixer lump ring, slurry residence time is reduced while maintaining mixing efficiency common to pin mixers. Accordingly, water:stucco ratio is reduced, which allows for increased speed of the wallboard production line and/or a reduction in drying energy demand. In an embodiment, the water:stucco ratio at the mixer was reduced 2%.

Conventional pin mixers are provided with a rotor or lump ring radially spaced from a central drive shaft, and secured to a mixer floor. A depending lid ring is spaced from the mixer floor and creates a flow baffle for the slurry as it migrates radially from the central shaft due to centrifugal force. The baffle effect of the lump ring and the lid ring is designed to prevent lumps or slurry particles greater than ⅜ inch (0.9525 cm). in diameter from escaping the mixer and becoming incorporated into the wallboard panels. By creating gaps in the lump ring, it has been found that the residence time of the slurry in the mixer is reduced, and also the water:stucco ratio is reduced compared to conventional pin mixers. In a preferred embodiment, the lump ring is split into three arcuate sections spaced circumferentially. Also preferred is that gaps between ends of the arcuate ring sections are approximately 2⅝ inches (6.6675 cm). Since the mixer preferably operates at 300 RPM, the arcuate ring sections are preferably approximately equal in length to maintain rotational balance.

More specifically, an agitator for a gypsum wallboard mixer is provided and includes a circular disc with an upper surface, a drive shaft extending vertically from the upper surface, a lump ring secured to the upper surface, the lump ring being provided in a plurality of spaced, adjacent arcuate segments.

In an embodiment, the disc has a vertical axis, and the drive shaft is mounted to the disc at the vertical axis.

In another embodiment, the lump ring is provided in three equal length segments, and gaps are formed between ends of the adjacent segments. Preferably, the gaps range from ⅜ to 2⅝ inches (0.9525-6.6675 cm).

In an embodiment, the lump ring is ⅜ inch (0.9525 cm) tall, and the agitator includes at least one agitating formation projecting from the upper surface of the disc. In a preferred embodiment, the at least one agitating formation is a pin.

In another embodiment, a slurry mixer is provided, including an upper wall and a lower wall, with an annular peripheral wall attached to and vertically separating the upper and the lower walls, the walls defining a chamber, a vertical axis defined by the upper and the lower walls, at least one inlet in at least one of the upper wall and the lower wall, a circular disc with an upper surface disposed in the chamber. A drive shaft extends vertically from the upper surface and projects from the upper wall. A lump ring is secured to the upper surface, the lump ring being provided in a plurality of spaced, adjacent arcuate segments.

DETAILED DESCRIPTION

Figure 1:
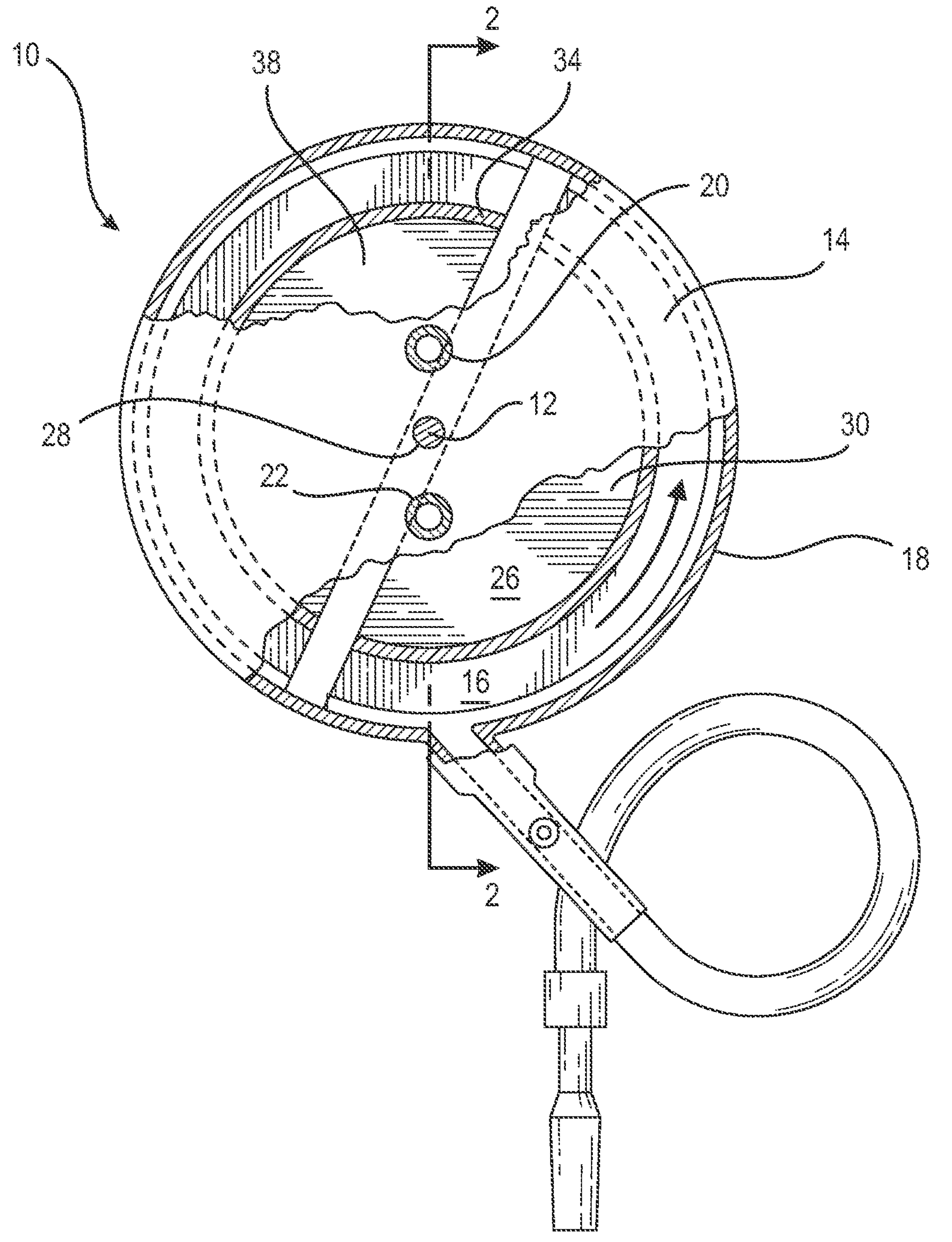
FIG. 1 (PRIOR ART)
FIG. 1 is an overhead plan view of a conventional gypsum slurry mixer.
Figure 2:
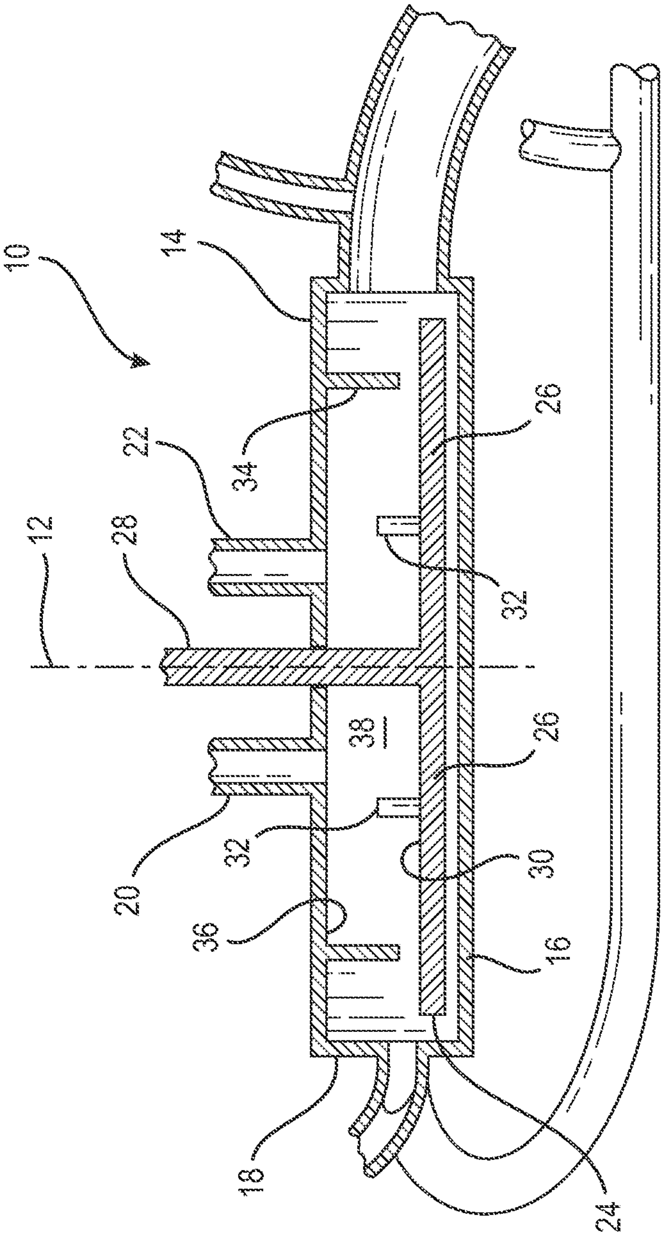
FIG. 2 (PRIOR ART)
FIG. 2 is a cross-section taken along the line 2-2 of FIG. 1 and in the direction generally indicated.

Referring now to FIGS. 1 and 2, a prior art gypsum wallboard slurry mixer is generally designated 10, having a generally cylindrical shape, with a generally vertical axis 12, and upper wall 14, a lower wall 16 and an annular peripheral wall 18 secured to and vertically spacing the upper and lower walls. An inlet 20 for calcined gypsum and an inlet 22 for water are both preferably positioned in the upper wall 14, preferably proximate the vertical axis 12. It is contemplated that the location of the inlets 20, 22 may vary to suit the application, and may be provided in the lower wall 16 depending on the application. Also, the inlets 20, 22 are connected to corresponding supplies of calcined gypsum and water that deliver constituents to the mixer 10 by gravity feed. Also, as is well known in the art, other materials in addition to gypsum and water are added to the slurry to prepare gypsum products, such materials, collectively referred to as additives, including but are not limited to accelerators, retarders, fillers, binders and the like. The additives are supplied through the inlets 20, 22 or through supplemental designated inlets (not shown).

Referring now to FIG. 2 an agitator 24 includes a circular disc 26 connected to a drive shaft 28 that is preferably located at the vertical axis 12. Preferably, the drive shaft 28 projects along the vertical axis from the upper wall 14. A motor (not shown) is connected to the drive shaft 28 and axially rotates the shaft and the disc 26. An upper surface 30 of the disc 26 preferably is provided with at least one vertically projecting agitating formation 32 such as a pin or a paddle to enhance agitation of the slurry. In addition, the mixer 10 includes an annular ring 34 connected to and depending from an inner surface 36 of the upper wall 14. The ring 34 is often referred to as a "lid ring", and enhances mixing action in the mixer 10 by preventing larger agglomerations or lumps of calcined gypsum from exiting an interior chamber 38 of the mixer before becoming more finely divided and dispersed in the slurry. As is known in the art, the agitator 24 is located within the chamber 38.

Figure 3:
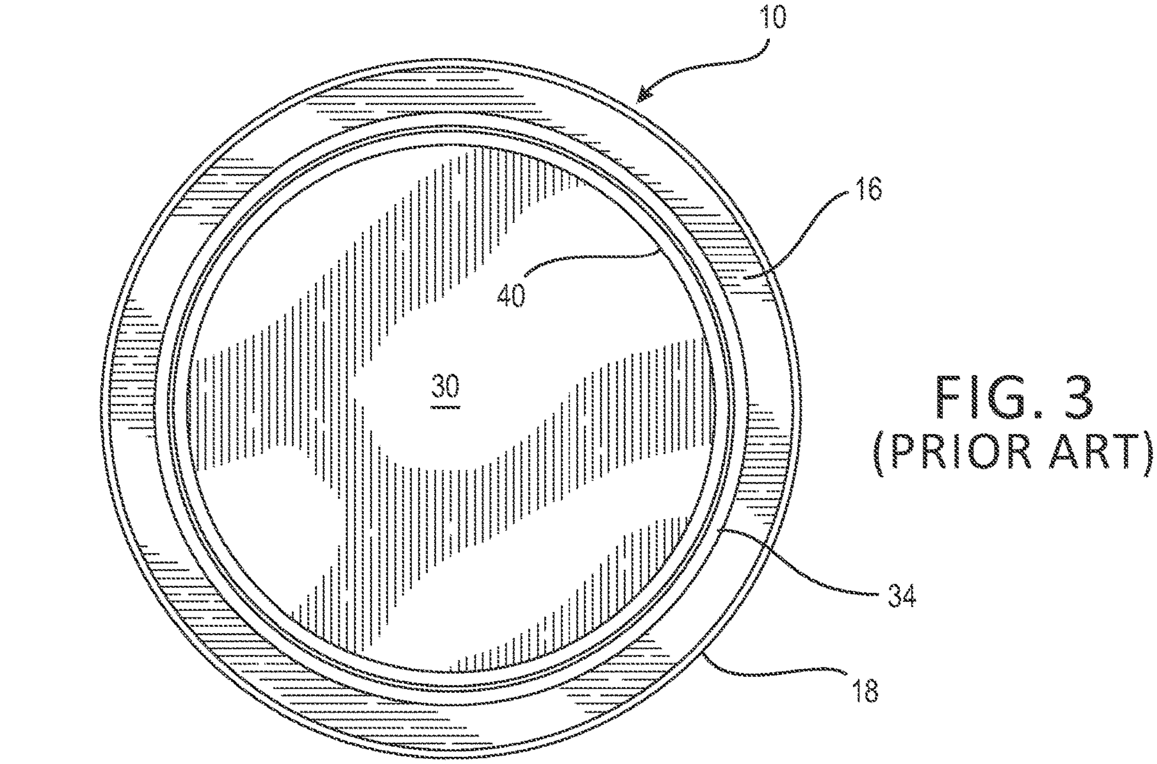
FIG. 3 (PRIOR ART)
FIG. 3 is a fragmentary overhead plan view of a conventional gypsum slurry mixer.
Figure 4:
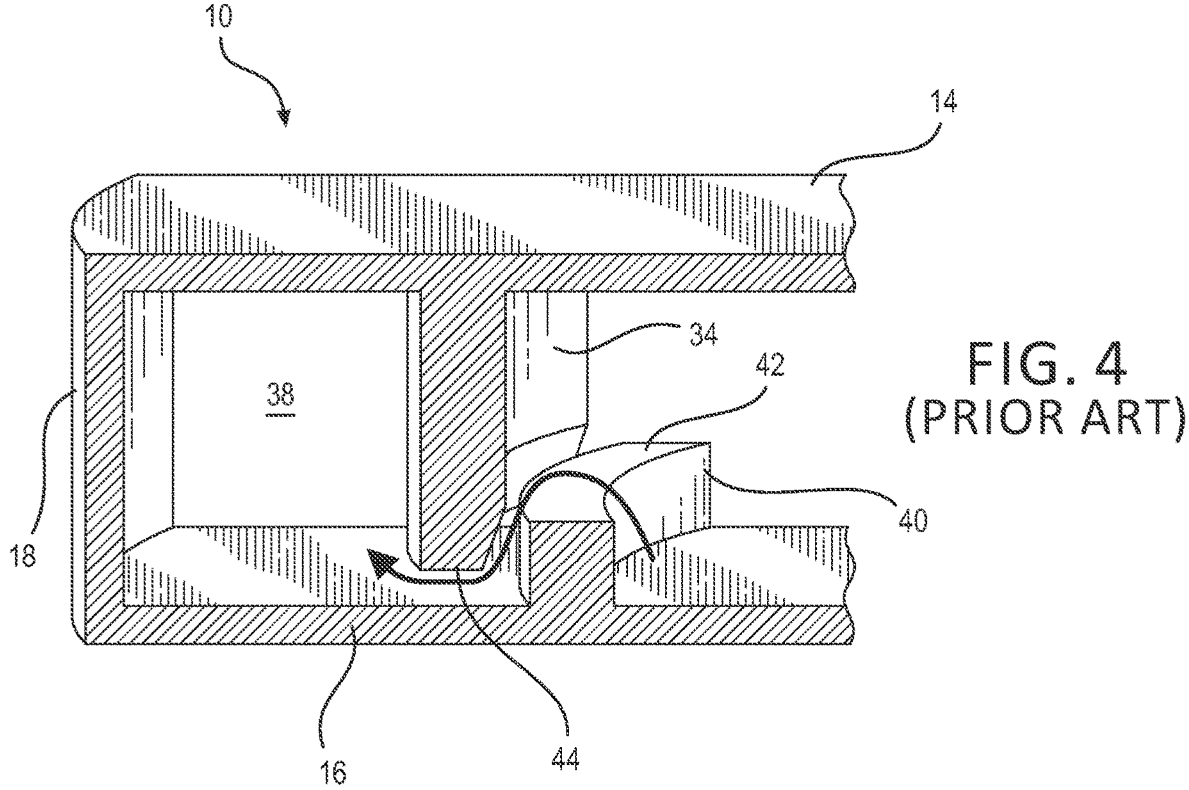
FIG. 4 (PRIOR ART)
FIG. 4 is a fragmentary side perspective view of the conventional slurry mixer of FIG. 3.

Referring now to FIGS. 3 and 4, it is also known to provide gypsum slurry mixers 10 with a so-called annular "lump ring" 40 attached to the upper surface 30 of the agitator disc 26. Preferably, the lump ring 40 has a diameter that is just smaller than the lid ring 34 and projects vertically upward, or opposite from the lid ring so that an upper edge 42 of the lump ring overlaps (while slightly radially displaced) a lower edge 44 of the lid ring to create a serpentine or labyrinth path (FIG. 4) for the slurry as it migrates from the vertical axis radially outwardly due to centrifugal force. A preferred height of the lump ring 40 is ⅜ inch (0.9525 cm).

It has been found that conventional mixers with the overlapping lid ring 34 and the lump ring 40 tend to increase the residence time of the slurry in the mixing chamber 38. A problem with longer slurry residence time in the mixing chamber 38 is that water needs to be added to maintain the desired viscosity of the slurry. In general, in wallboard panel production, it is undesirable to add water to the slurry because of the additional energy in the form of heat that is needed to dry the panel after forming. This heat is typically applied downstream of the mixer 10, after the wallboard panels have been formed.

Figure 5:
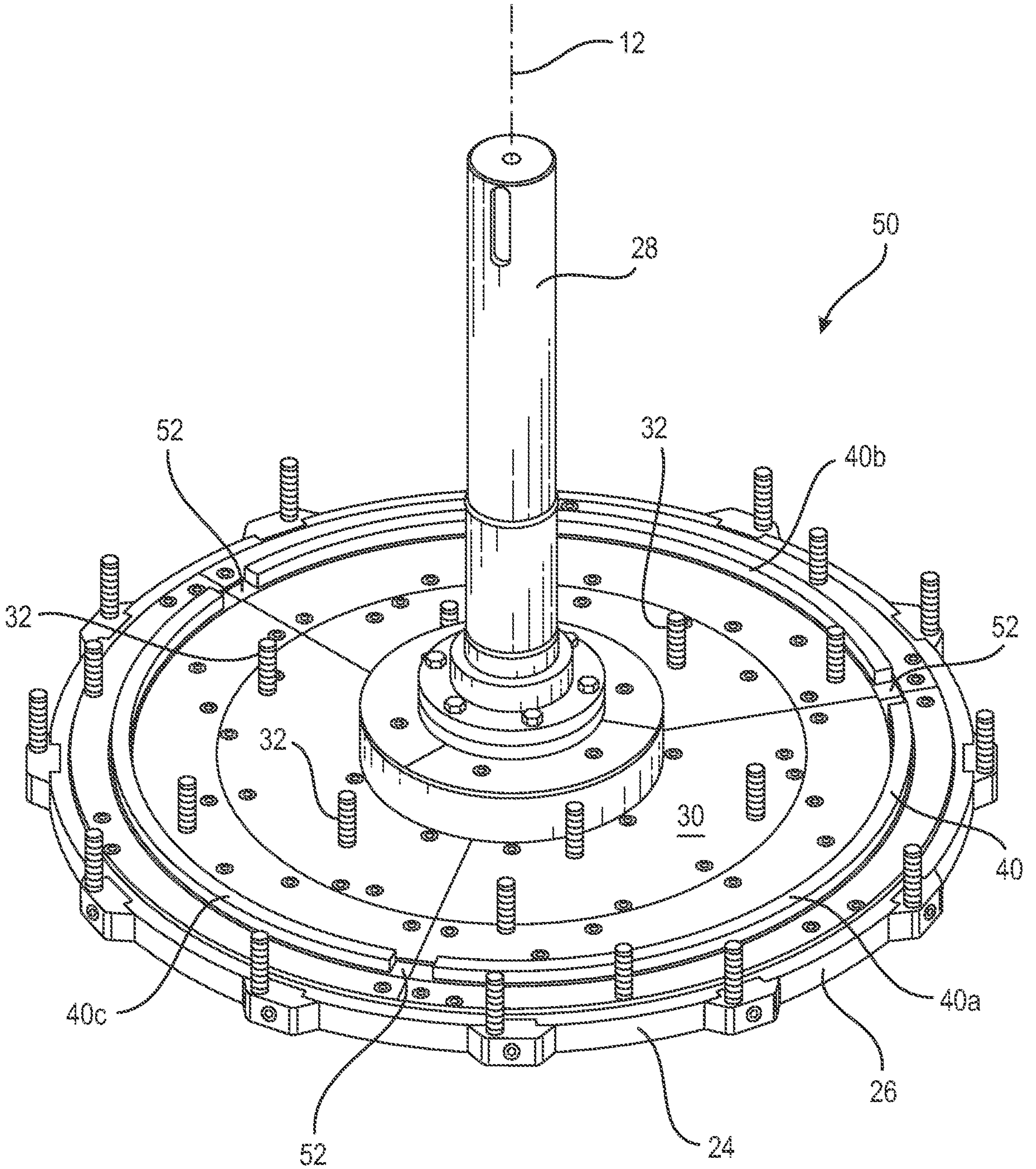
FIG. 5 is a fragmentary top perspective view of the present gypsum slurry mixer.
Figure 6:
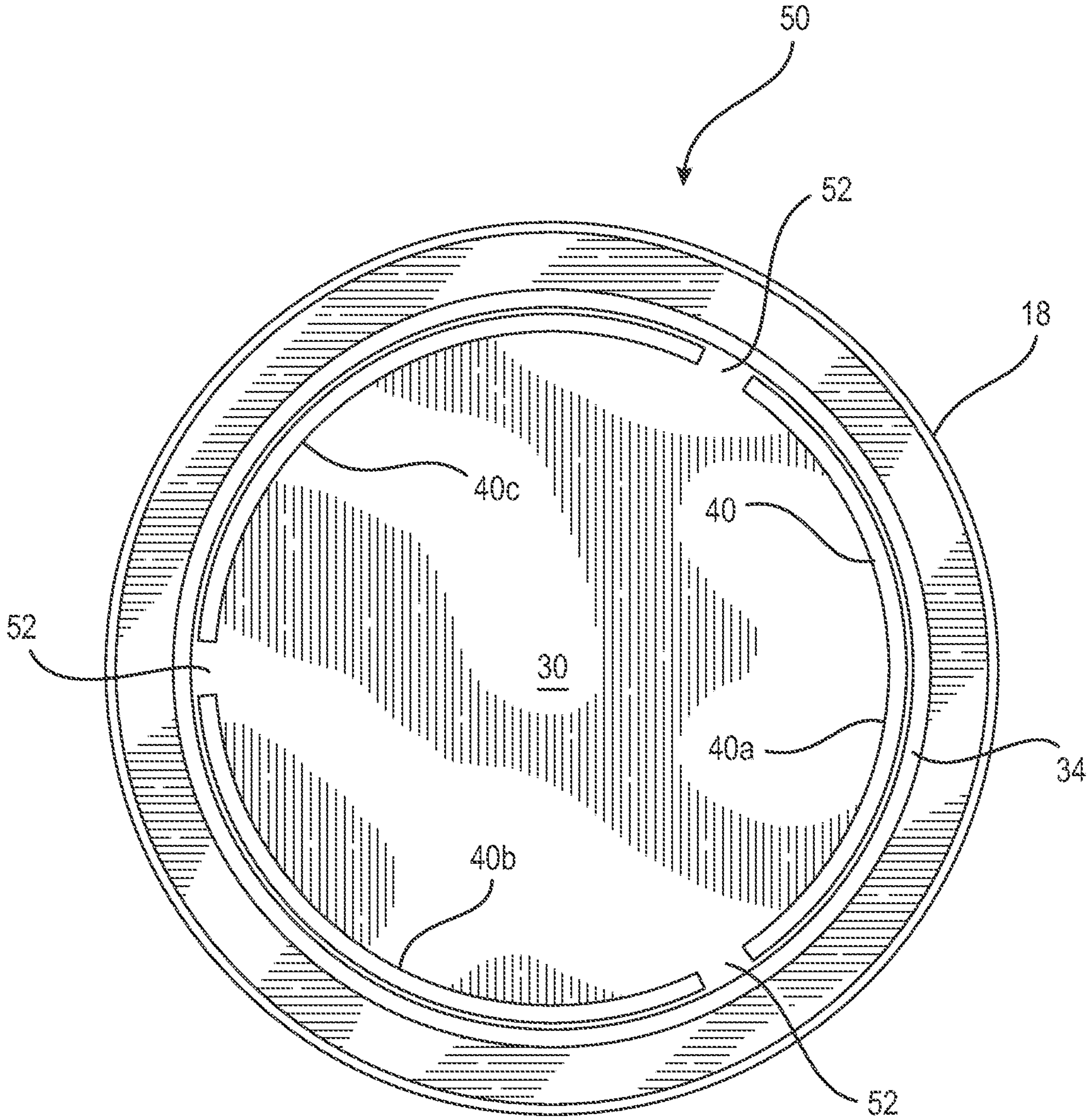
FIG. 6 is a fragmentary overhead plan view of the present gypsum slurry mixer.
Figure 7:
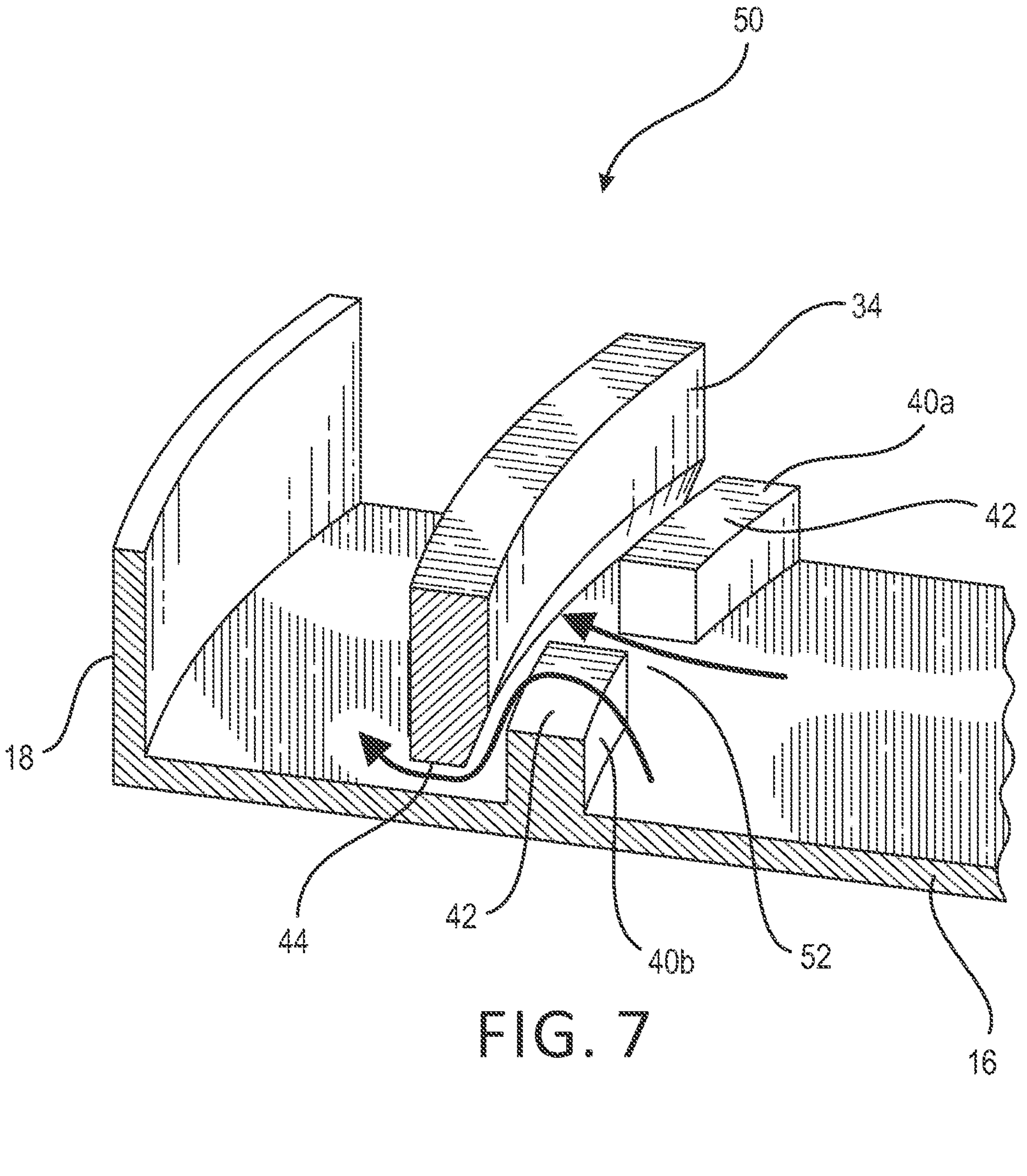
FIG. 7 is a fragmentary side perspective view of the present gypsum slurry mixer.

Referring now to FIGS. 5-7, the present wallboard slurry mixer is generally designated 50 and components shared with the mixer 10 are designated with identical reference numbers. A main feature of the mixer 50 is that the lump ring 40 is separated into three arcuate segments designated 40*a*, 40*b*, 40*c*. Each pair of the segments 40*a*, 40*b*, 40*c* is separated by a gap 52 which preferably extends vertically a height "H" of the lump ring 40 and ends at the upper surface 30 of the disc 26. While it is contemplated that the gap 52 varies between ⅜ inch to 3 inches, a preferred gap is 2⅝ inches (6.6675 cm). To maintain balance of the rotating disc 26, which has a rotational speed of approximately 300 RPM, three gaps 52 are provided in the lump ring 40, and the segments 40*a*, 40*b* and 40*c* are equal in arcuate length. In the preferred embodiment, each of the segments 40*a*, 40*b*, 40*c* extend approximately 120° of a circle defined by the lump ring 40. It is contemplated that other segment lengths are contemplated depending on the particular application.

An advantage of providing the gaps 52 in the lump ring 40 is that the residence time of the slurry in the chamber 38 of the mixer 50 is reduced. By reducing the slurry residence time, the amount of water added to the slurry during mixing is also reduced, which consequently reduces the amount of energy needed to dry the wallboard panels once formed on the production line downstream of the mixer 50. A common measure of the amount of water in the gypsum wallboard slurry in the mixer 50 is the water:stucco ratio. This value represents the Total Water Weight divided by the Stucco Weight×100%. A typical water:stucco ratio is 80%. In other words, for 1,000 pounds of stucco, 800 pounds of water is used. Using the water:stucco ratio, a value of Total Calculated Water is achieved using the equation:

$$\text{Total Water}=\text{Stucco}\times\text{Water:Stucco Ratio.}$$

It has been found that the use of the gaps 52 has reduced the water:stucco ratio in the mixer 50 2% compared to the similar performance of the conventional mixer 10. With the prior art lump ring without the gaps 52, the mixer 10 had a water:stucco ratio of 85.5%. Using the present lump ring 40 with the gaps 52 resulted in a water:stucco ratio of 83.5%. In the mixer 10 with the prior lump ring, using the above formula: 0.855 (water:stucco ratio)×9211b/MSF (stucco)=787.45 lb/MSF total water. In contrast, with the present mixer 50 having the gaps 52: 0.835×921 lb/MSF=769 lb/MSF total water. The resulting 18 lb/MSF of total water reduction translates to a reduction of 10 degrees of heat in the kiln used to dry the resulting wallboard panels, and an increase of 5 ft/min of board speed.

It has been found that the presence of the gaps 52 does not impair the function of the lump ring 40 in regulating the size of calcinated gypsum lumps which are allowed to pass out of the mixer 50.

While a particular embodiment of the present wallboard slurry mixer configured for reducing water:stucco ratio has been described herein, it will be appreciated by those skilled in the art that changes and modifications may be made thereto without departing from the invention in its broader aspects and as set forth in the following claims.

The invention claimed is:

1. An agitator for a gypsum wallboard mixer, the mixer including an annular lid ring having a diameter and connected to and depending from an inner surface of an upper wall, said agitator comprising:

a circular disc with an upper surface;

a drive shaft extending vertically from said upper surface;

a lump ring secured to said upper surface, said lump ring having a diameter just smaller than said annular lid ring and being provided in three spaced, adjacent arcuate segments, each said segment extending approximately 120° of a circle defined by said lump ring; and wherein gaps are formed between ends of said adjacent segments.

2. The agitator of claim 1, wherein said circular disc has a vertical axis, and said drive shaft is mounted to said circular disc at said vertical axis.

3. The agitator of claim 1, wherein said three segments are of equal length.

4. The agitator of claim 1, wherein said gaps range from ⅜ to 2⅝ inches.

5. The agitator of claim 1, wherein said lump ring is ⅜ inch tall.

6. The agitator of claim 1, further including at least one pin projecting from said upper surface of said circular disc.

7. The agitator of claim 1, wherein an upper edge of said lump ring overlaps a lower edge of the lid ring to create a serpentine path for the slurry as the slurry migrates radially outwardly due to centrifugal force.

8. A slurry mixer, comprising:

an upper wall and a lower wall, with an annular peripheral wall attached to and vertically separating said upper and said lower walls, said upper, lower and annular peripheral walls defining a chamber, an annular lid ring having a diameter and connected to and depending from an inner surface of said upper wall;

at least one inlet in at least one of said upper wall and said lower wall;

a circular disc with an upper surface disposed in said chamber;

a drive shaft extending vertically from said upper surface and projecting from said upper wall;

a lump ring secured to said upper surface, said lump ring having a diameter just smaller than said lid ring and being provided in three spaced, adjacent arcuate segments each extending approximately 120° of a circle defined by said lump ring; and wherein gaps are formed between ends of said adjacent segments and wherein an upper edge of said lump ring overlaps a lower edge of the lid ring to create a serpentine path for the slurry as the slurry migrates radially outwardly due to centrifugal force.

9. The mixer of claim 8, wherein said lump ring is provided in three equal length segments.

10. The mixer of claim 8, wherein said gaps range from ⅜ to 2⅝ inches.

11. The mixer of claim 8, wherein said lump ring is ⅜ inch tall.

12. The mixer of claim 8, further including at least one agitating formation projecting from said upper surface of said circular disc.

13. The mixer of claim 12, wherein said at least one agitating formation is a pin.

* * * * *